July 26, 1938.   R. B. LEWIS   2,125,117
SPEED COMPARING DEVICE
Filed Sept. 26, 1933    2 Sheets-Sheet 1

INVENTOR
ROBERT B. LEWIS,
BY
Robert M. Barr
ATTORNEY

July 26, 1938.  R. B. LEWIS  2,125,117
SPEED COMPARING DEVICE
Filed Sept. 26, 1933  2 Sheets—Sheet 2
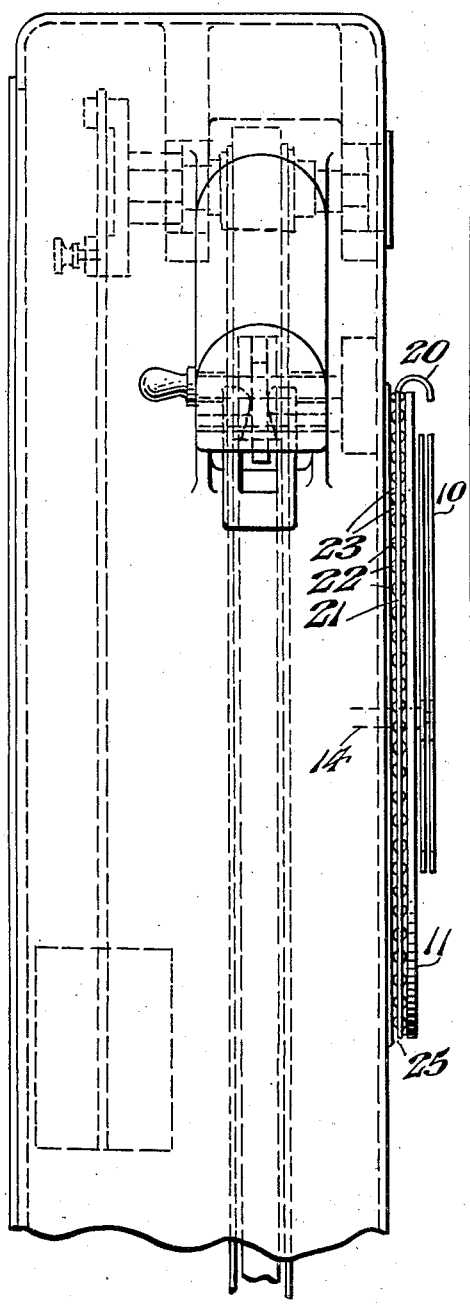
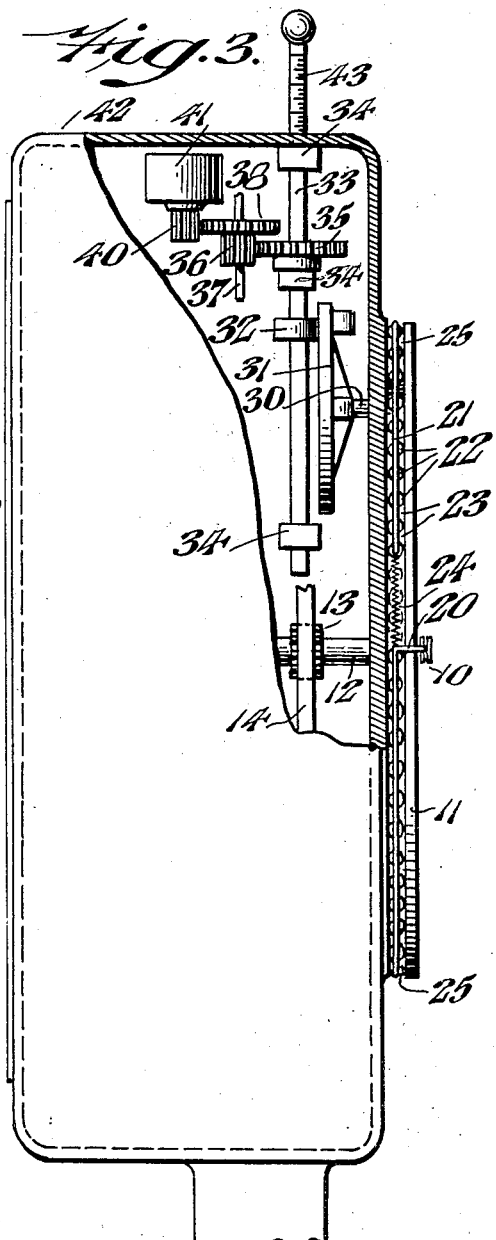
INVENTOR
ROBERT B. LEWIS
ATTORNEY Patented July 26, 1938

2,125,117

UNITED STATES PATENT OFFICE 2,125,117

SPEED COMPARING DEVICE

Robert B. Lewis, Philadelphia, Pa., assignor to Tinius Olsen Testing Machine Company, Philadelphia, Pa., a corporation of Pennsylvania Application September 26, 1933, Serial No. 690,994

5 Claims. (Cl. 73—51)

The present invention relates to speed comparing devices and more particularly to an element of this character operating in conjunction with a testing machine to insure a uniform constant rate of loading.

The present application is filed as a continuation in part of applicant's co-pending application, Serial No. 637,394, filed October 12th, 1932, for Universal testing machine.

In testing machines of the tension or compression type it is an essential part of every test that the operator of the machine know the rate at which the load is applied to the specimen under test, and it is also desirable to be able to check the rate of loading at any time during the testing operation.

It is one object of the present invention to provide a speed comparing device which is more particularly adapted for use in testing machines, though also capable of being used with other equipment. It is another object of the invention to provide a speed comparing device which can be readily set to any desired rate of speed and which when initially set will maintain that selected speed. Another object of the invention is to provide a simple, efficient, variable speed control for a speed comparing device, whereby any one of a number of speeds can be selected at will. It is a further object of the invention to provide means whereby a definite constant loading rate of a testing machine can be maintained; and to provide other improvements as will hereinafter appear.

Figure 1:
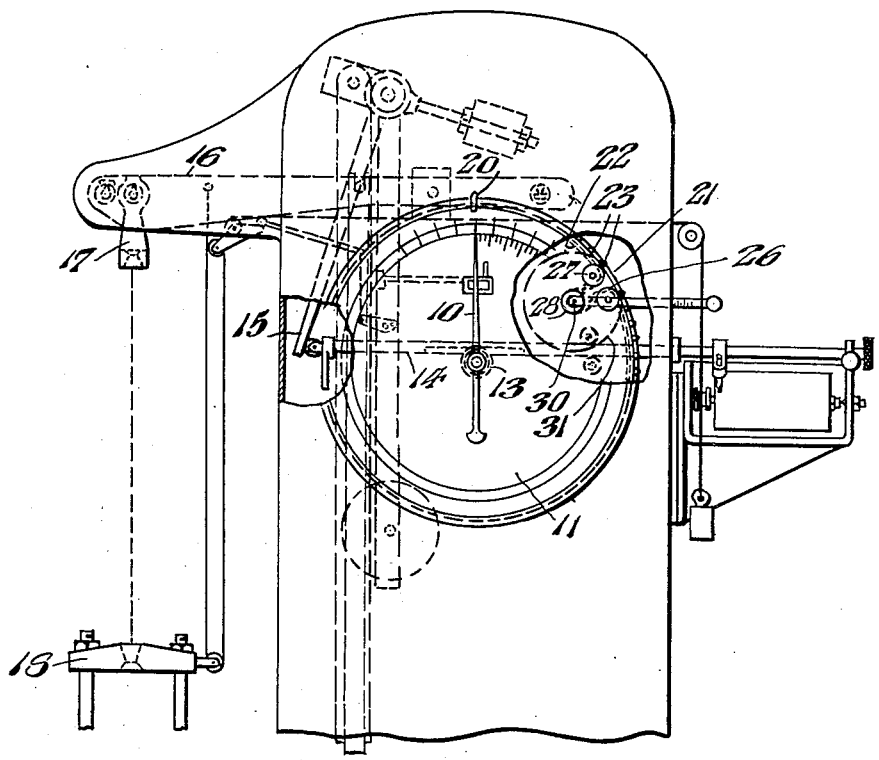
Figure 4:
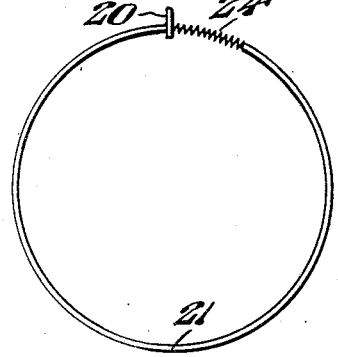
Figure 5:
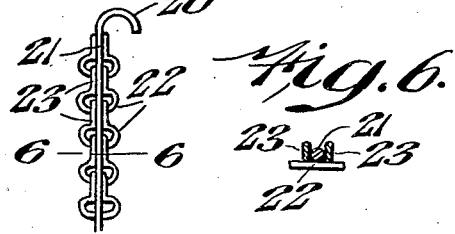
Figure 6:
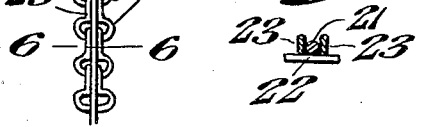

In the accompanying drawings Fig. 1 represents a side elevation of a portion of a testing machine equipped with a speed comparing device embodying one form of the present invention; Fig. 2 represents an end elevation of the same; Fig. 3 represents a detail in plan broken away to show the driving mechanism for the speed comparing device; Fig. 4 represents a detail of one form of carrier for the speed indicator; Fig. 5 represents on a larger scale a detail of the carrier mounting; and Fig. 6 represents a section on line 6—6 of Fig. 5.

Referring to the drawings one form of the present invention is shown as used with a testing machine to serve as a pacer or speed comparing means for the pointer 10 which rotates about the face of a dial 11 when driven by a spindle 12. In the present machine the spindle 12 is driven by a gear 13 in mesh with a reciprocable rack 14 which is responsive to an arm 15 controlled by the action of a weighing system of the pendulum type. The beam 16 of the weighing system is responsive to the load applied to the yoke 17 which is connected through the test piece with the load applying cross-head 18. In a testing machine of this character it is essential that the load be applied uniformly and that its rate of application be known.

For the purpose of checking and setting the pointer 10 so that it travels at a predetermined rate around the face of the dial 11 a pacer element or speed comparing pointer 20 is attached to a wire 21 of ring form which encircles a driven chain 22 and is held in place between the pairs of links 23 in order that it be prevented from lateral displacement. The length of the wire ring 21 is preferably shorter than the length of the chain 22 and its ends are connected by a coil spring 24 which serves to hold the ring 21 in frictional contact with the chain 22. Obviously the ring 21 can be of spring material. As here shown the chain 22 is arranged to travel in a circular track 25 formed in the back support of the dial 11, but at one point in the circumference the track 25 is broken away to form a path between two guide or idle rolls 26 and 27 for the passage of the endless chain 22 so that said chain can pass around a driven sprocket wheel 28. This sprocket wheel 28 is fast to a shaft 30 which carries a disc 31 arranged to be frictionally driven by a friction wheel 32 keyed to a longitudinally shiftable shaft 33. The shaft 33 is mounted in suitable bearings 34 and the speed of rotation of the disc 31 is determined by the position of the wheel 32 with respect to the axis of the disc 31. As here shown, the shaft 33 carries a gear 35 which is keyed thereon and meshes with a relatively long gear 36 in order to maintain the meshing relation for any operative position of the shaft 33. The gear 36 is keyed to a shaft 37 which is driven by a gear 38 in mesh with the pinion 40 of a constant speed motor 41. The gear train 35 to 40 inclusive provides a suitable reduction from the constant speed motor 41 as will be understood. Preferably the end of the shaft 33 which projects through the casing 42 is graduated in terms of track speed as shown at 43 in order to correspond to the rate of load applied to the specimen in the machine so that the shaft can be pushed in or out as the case may be to fix the predetermined loading rate.

In assembling the speed comparing device of the present invention the endless chain 22 is brought around the sprocket 28 and over the two idler rolls 26 and 27 and passed around the circumference of the indicating device to seat in the groove 25 at the back of the dial 11. The ring or pacer element 21 is then stretched to encircle the chain 22 and when properly located it is released so that the spring 24 causes the ring 21 to seat between the chain links all the way around the circumference and hold it gripped so that it travels with the chain at the predetermined rate without slippage. The ring 21 being a substantially continuous band about the chain 22 bridges the space between the rollers 26 and 27 so that the pointer 20 is free to make as many revolutions as may be required.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. A speed comparing device comprising a circular track, a flexible member arranged to ride on said track, means to drive said member at a predetermined speed, a ring frictionally held upon said member, and a pointer attached to said ring for indicating the movement of said member.

2. A speed comparing device comprising a body forming a circular peripheral track having an opening to the interior of said body, a wheel rotatably mounted in said body opposite said opening, a continuous member mounted to ride on said track and having a loop passing through said opening and encircling said wheel, a ring clamped upon said member to be driven frictionally thereby, means to drive said wheel to cause said member to travel around said track, and means on said ring for indicating the speed of said member.

3. A speed comparing device comprising a body forming a circular peripheral track having an opening to the interior of said body, a wheel rotatably mounted in said body opposite said opening, a continuous member mounted to ride on said track and having a loop passing through said opening and encircling said wheel, a ring having a spring stretched in its length to clamp said ring to said member for friction drive purposes, means to drive said wheel to cause said member to travel around said track, and means on said ring for indicating the speed of said member.

4. A speed comparing device comprising a ring provided with a pointer, means for supporting and frictionally driving said ring, and means for rotating said supporting means.

5. A speed comparing device comprising a ring provided with a pointer, means including a chain for supporting and frictionally driving said ring, said chain having an inwardly disposed loop, and means coacting with said loop for rotating said chain.

ROBERT B. LEWIS.